Nov. 15, 1938.  C. M. FIELDS ET AL  2,136,423
POLYMERIZATION PROCESS
Filed June 2, 1937

Charles M. Fields
Reuben T. Fields
INVENTORS

BY
ATTORNEY.

Patented Nov. 15, 1938

2,136,423

UNITED STATES PATENT OFFICE 2,136,423

POLYMERIZATION PROCESS

Charles M. Fields and Reuben T. Fields, Arlington, N. J., assignors to E. I. du Pont de Nemours & Company, Wilmington, Del., a corporation of Delaware Application June 2, 1937, Serial No. 145,934

5 Claims. (Cl. 18—55)

This invention relates to a polymerization process and, more particularly, to a process of polymerizing organic compounds in elongated shapes such as rods, tubes, sheets, and the like.

The polymerization of certain organic liquid compounds into rods, tubes, sheets, and other primary shapes from which articles may be fabricated by machining processes, as well as the polymerization of such compounds in finished shapes, is known. This invention relates to improvements in such processes where applied to organic compounds that are polymerizable to at least fairly hard solid shapes suitable for use as "turnery resins" and which, in the course of the polymerization reaction, release considerable heat and undergo appreciable shrinkage; the term "polymerizable organic compounds" as used throughout the specification is intended to mean a compound of this character.

Polymerizable organic compounds are readily polymerized upon the application of heat, either in the presence or absence of a catalyst for the polymerization reaction, to a relatively hard solid body but, because the reaction of polymerization involves appreciable shrinkage, (i. e., the solid polymer is denser than the liquid monomer), the polymerization of the monomeric compounds in molds, a species of casting and not of heat and pressure molding, to give a flawless product of the full cross section of the mold, has involved great difficulty.

An object of the present invention is to provide a simple and economical process of producing flawless objects of polymerized organic compounds in elongated shapes. A further object is to provide a process wherein molds of light, simple construction may be used. Other objects of the invention will be apparent from the description given hereinafter.

The above objects are accomplished according to the present invention by introducing into a substantially vertically positioned elongated mold closed at the lower end a substantial quantity of a liquid composition comprising a monomeric polymerizable organic compound and applying heat from an external source to the bottom of the mold only until the liquid composition is polymerized to a solid body and simultaneously subjecting the liquid composition to pressure, the viscosity of the liquid composition as introduced into the mold being sufficient to prevent development of convection currents therein during the polymerization.

The invention is based upon recognition of the fact that organic compounds of the type under consideration may be polymerized without the development of flaws due to local areas of excessive temperature or to shrinkage, provided that the polymerization at any time is confined to a narrow zone or layer. The present invention depends further upon providing, adjacent to the zone in which the polymerization is proceeding, a mass of incompletely polymerized material in a flowable condition so that it is capable of moving toward and into the zone of polymerization to compensate for the shrinkage accompanying the polymerization going on in the zone.

The invention will be described more specifically with reference to the accompanying drawing wherein.

Figures 1, 2, 3:
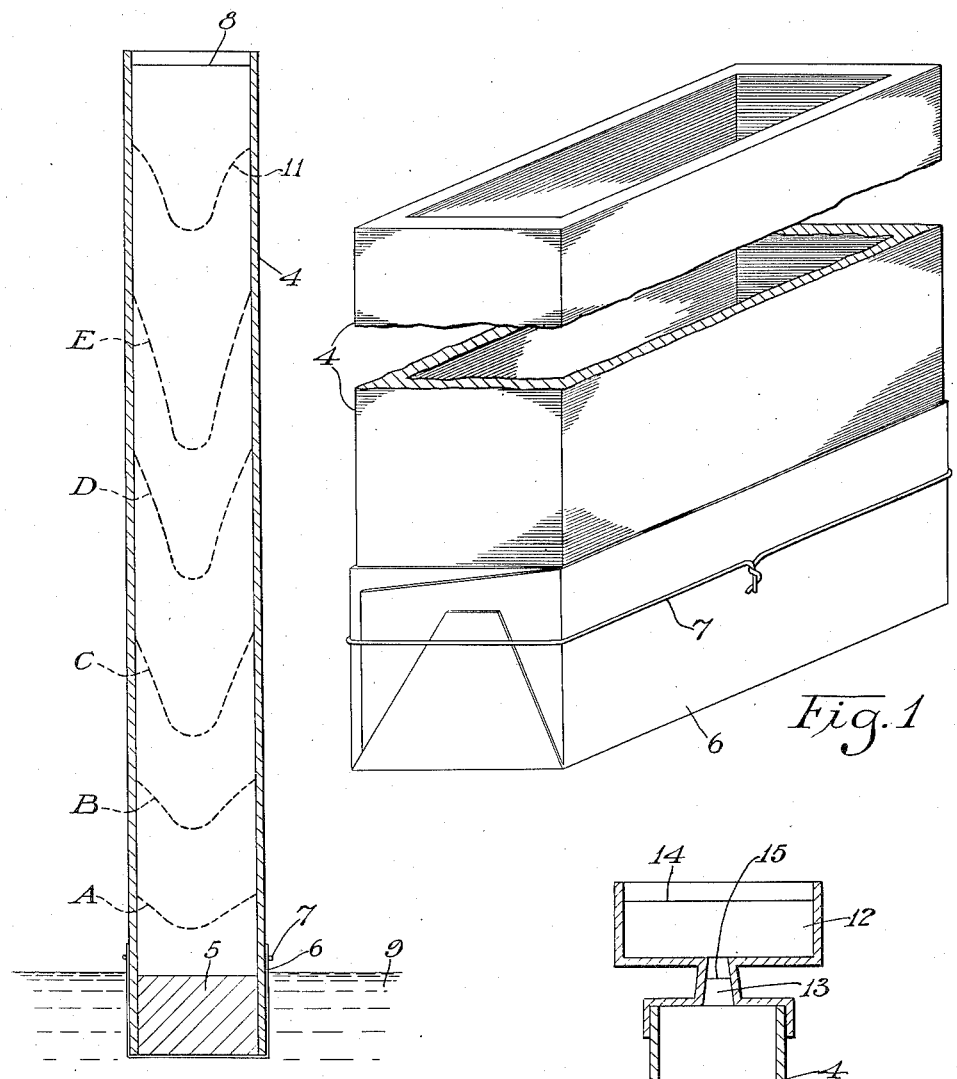
Fig. 1 is a perspective view, parts being broken away, of a mold suitable for carrying out the process of the present invention.
Fig. 2 is a vertical section of the mold shown in Fig. 1.
Fig. 3 is a vertical section of the upper portion of a mold similar to that shown in Figs. 1 and 2 but having a reservoir attached.

In the following example, illustrating a specific embodiment of the invention, reference is made to Figs. 1 and 2 of the drawing:

*Example 1.*—A mold comprising the rectangular shaped drawn aluminum tubing 4 of inside dimensions 1.625" x 3.125" and having its lower end closed by a 1" thick plug 5 of polymerized methyl methacrylate, is employed. Over the bottom of the mold is wrapped a membrane 6 of regenerated cellulose film known as "Cellophane", this film being kept in place by the wire 7.

The mold is filled to the level 8 (see Fig. 2) with a flowable syrup of methyl methacrylate having a viscosity about that of ordinary "corn syrup". This methyl methacrylate composition contains 6–8% of polymerized methyl methacrylate and may be made either by dissolving polymer in monomer or heating monomeric methyl methacrylate until polymerization has progressed to the point where the viscosity described, is obtained. This syrup contains .03% of benzoyl peroxide as a polymerization catalyst.

The loaded mold is then placed in vertical position in an autoclave (not shown in the drawing) in the bottom of which is a heating liquid such as mineral oil, indicated by reference numeral 9 in Fig. 2. In operating position the level of the heating liquid 9 comes to approximately the bottommost level of the methyl methacrylate syrup to be polymerized in the mold. The heating liquid is maintained at 72° C. and a pressure of 150 pounds per square inch is placed upon the contents of the autoclave by means of nitrogen gas for a period of 18 hours, at the end of which time the syrup is converted to a solid body. Upon cooling down the mold, the elongated block of polymer is removed therefrom by gentle tapping. It is homogeneous, clear, clean, and highly suitable for turnery purposes.

The heating of the bottom of the mold in the above example raises the temperature of the methyl methacrylate adjacent the bottom to approximately 72° C., the temperature of the heating liquid. Due to the heat conductivity of the walls 4 of the mold, heat is applied also to the methyl methacrylate further up the mold but the temperature becomes progressively lower as the distance from the heating liquid becomes greater. Because of this gradient of the external heat applied to the mold, the methyl methacrylate at the bottom polymerized most rapidly and, as it is converted into a solid with the accompanying shrinkage in volume, the space left vacant by the shrinkage is continuously kept filled up by the downward movement of the still flowable material above. The shrinkage resulting from polymerization therefore does not cause formation of any voids and the solid polymer formed has the full cross sectional dimensions of the mold cavity.

The polymerization reaction is exothermic and the heat thus released during the active polymerization of the bottommost layer of methyl methacrylate is dissipated in part by conduction up the walls of the mold; it is only slightly dissipated by convection currents, the initial viscosity of the methyl methacrylate syrup being deliberately made high enough to prevent substantially the development of convention currents. The temperature in the bottommost layer undergoing active polymerization probably reaches 80° C. or so, and hence the methyl methacrylate immediately above this layer is gradually raised to a temperature sufficient to cause it to undergo active polymerization and this, in turn, gradually raises the temperature of the layer immediately above it to cause active polymerization there in due course. In this way, a relatively narrow zone of active polymerization gradually travels up the mold until the whole mass of methyl methacrylate is completely polymerized.

Actually, the zone of active polymerization is continually advancing up the mold but at any one instant it is confined to a relatively shallow layer. For purposes of illustration, the dotted lines A, B, C, D, and E are shown as marking off the upper limits of zones of active polymerization at successive stages of the process. Since the heat is transmitted to the methyl methacrylate adjacent the walls of the mold quicker than to the methyl methacrylate in the interior, polymerization adjacent the walls of the mold is slightly further advanced which accounts for the curvature indicated and the contour of the top of the finished solidified resin as indicated by the line 11 of Fig. 2. The finished resin is perfectly homogeneous and there is no actual layer formation detectible.

The exothermicity of the reaction of polymerization tends to cause volatilization of monomer during the polymerization and the process is carried out under pressure to combat this tendency.

As illustrated in Fig. 2, the level of the polymerizable syrup is not only lowered from the line 8 to the line 11 but is also sunken in the middle as indicated by the line 11. Accordingly, the topmost portion of the polymer in the mold must be discarded as scrap. This loss can be eliminated by providing a reservoir as shown in Fig. 3. This reservoir is mounted on the mold 4 and comprises the main reservoir portion 12 and a constricted channel 13 continuous with the cavity of the mold proper. By filling the reservoir to the level 14, the shrinkage during polymerization merely lowers the level to the line 15 so that the mold cavity proper is left entirely filled with polymerized resin and only the small portion extending into the channel 13 must be discarded as scrap.

Obviously, if an open end mold is to be used, it is not necessary to use a plug of methyl methacrylate polymer as disclosed in Fig. 2, although this is a particularly convenient expedient. Other means for closing the end of the mold, such as a screw cap of metal, could be employed. While the plug 5 may not be absolutely fluid tight at first, the action of the methyl methacrylate syrup swells the plug so as to give a tight joint shortly after the syrup has been introduced into the mold. The purpose of the "Cellophane" wrapping is to keep the heating liquid from getting into the mold. Closed end molds may be employed if desired.

The mold may be made of any suitable metal which is free from adverse effect upon the reaction of polymerization or upon the quality of the product. For permanent molds of uniform cross section, particularly of simple geometrical shapes, seamless drawn aluminum tubing is particularly suitable. Copper and copper alloys are, in general, undesirable because they tend to inhibit polymerization and to cause discoloration of the contents of the mold. Lead is undesirable because of its tendency to create haze in the polymer but alloys of lead and tin, for example, in the proportions of 97 parts lead and 3 parts tin are entirely satisfactory. Closed end molds may be made from these lead-tin alloys by the dipping of a "master mold" into the molten alloy in the manner well known in the cast phenolic resin art.

The above example is merely illustrative and the procedural details may be varied widely without departing from the scope of the present invention.

It is an important feature of the present invention to prevent the development of convection currents during polymerization by the use of a polymerizable syrup of substantial viscosity. This syrup may be made either by partially polymerizing monomer prior to its introduction into the mold or by dissolving polymer in monomer. As a practical matter, it has been found that a syrup having at least the viscosity of a syrup obtained by dissolving five parts of polymerized methyl methacrylate in 95 parts of monomeric methyl methacrylate, represents about the minimum viscosity desirable. The use of such syrups is also advantageous in that it promotes the speed and smoothness of the process as active polymerization of the material is induced more quickly upon heating it.

As shown in the specific example, a polymerization catalyst such as benzoyl peroxide may be advantageously used. Those skilled in the art will understand that the catalyst used, together with the temperature of the heating fluid and the pressure under which the material is maintained, must be balanced in order that polymerization may be confined to a relatively shallow layer. Ordinarily, the temperature to which the polymerizable material is heated in the course of polymerization must be selected as suitable for the particular polymerizable compound in question under the conditions of pressure and of cross sectional dimensions of the mold being used. Normally, the temperature will be permitted to rise high enough to permit polymerization at an economical speed but not so high as to involve the risk of overheating.

To prevent the formation of bubbles in the polymer, pressures upon the polymerizable material between about 100 and 200 pounds per square inch will ordinarily be found preferable. Pressures as low as 50 pounds per square inch may be used but are less desirable as greater care to prevent bubbling in the polymerizing material is necessary. Although pressures in excess of 200 pounds per square inch permit the more rapid conduct of the polymerization by suppressing the increased tendency of the mass to bubble, such pressures are usually less desirable practically because the pressure vessel must be correspondingly stronger.

The process of the present invention is well adapted to polymerization in molds up to 15" in height. Although the process may be applied to polymerization of material in molds of greater height, special precautions must be taken.

Ordinarily, it is more practical to conduct the process with molds open at their tops and employing an autoclave containing a gas under pressure but the necessary pressure upon the mass undergoing polymerization may be applied and maintained in other ways, if desired.

The present invention is applicable generally to polymerizable organic compounds, among which may be mentioned the following:

Methyl methacrylate
Ethyl methacrylate
Butyl methacrylate
Isobutyl methacrylate
Secondary butyl methacrylate
Tertiary amyl methacrylate
Phenyl methacrylate
Glycol monomethacrylate
Cyclohexyl methacrylate
Para-cyclohexylphenyl methacrylate
Decahydro - beta - naphthol methacrylate
Di-isopropyl carbinol methacrylate
Furfuryl methacrylate
Ethyl methylene malonate
Methallyl methacrylate
Tetrahydrofurfuryl methacrylate
Methacrylonitrile
Styrene
Alpha methyl styrene
Vinyl acetate
Vinyl acetate-vinyl chloride
Vinyl butyrate
Vinyl chlorobenzene
Vinyl naphthalene
Vinyl ethinyl carbinol
Methyl vinyl ketone
Dimethyl itaconate The above compounds may be used either alone or in admixture with each other.

While, per se, the following polymerizable organic compounds are not particularly well adapted for use in the present process, when mixed with methyl methacrylate or others of the compounds above, they give interpolymers which may be highly useful; glycol dimethacrylate, divinyl benzene, and methacrylic acid.

Vinyl chloride, a gas under atmospheric conditions, gives a polymer having useful properties as a turnery resin. This compound is a liquid under pressures of 50 pounds per square inch or so and may be used in the present process where conditions permit convenient handling of a compound of this nature.

The primary purpose of the present invention is the manufacture of turnery resins and the invention will not ordinarily be applied to the polymerization of compounds giving softer resins not generally suitable for turnery purposes. However, the invention is applicable to these softer resins also and, in some instances, it may be desirable to polymerize these resins in elongated shapes. Among the polymerizable organic compounds giving resins of this softer type may be mentioned:

Methyl acrylate
Ethyl acrylate
Butyl acrylate
Diethyl furmarate
Diethyl maleate
Divinyl ether.

Coloring matter, either soluble or insoluble, plasticizers, and various modifiers, and the like, may be mixed in the liquids to be polymerized. Polymerization catalysts such as benzoyl peroxide may be used. The selection and use of these various agents will be apparent to those skilled in the art. If a polymer is to be used for turnery purposes, it may be necessary or desirable to omit plasticizers. The process may be carried out in the absence of polymerization catalysts but preferably such catalysts are used.

Although the invention has been described specifically as applied to making sheets or blocks, it is equally applicable to the formation of elongated bodies in shapes of other cross sections, including rods, and the like.

The present invention is thus applicable for manufacturing in substantially finished form such articles as handles for mirrors, brushes, and the like, and blanks, slugs, blocks, and sheets adapted to be finished by various machining operations.

One advantage of the present invention is that it provides a simple and economical means of producing flawless turnery shapes from polymerizable organic compounds which heretofore have entered this field in only limited amounts because of the difficulty resulting from the large shrinkage accompanying their polymerization. A further advantage of the invention is that it can be carried out readily with simple and inexpensive apparatus and, with the control of the temperature involved in the process, can be put upon an automatic basis.

As many apparently widely different embodiments of this invention may be made without departing from the spirit and scope thereof, it is to be understood that the invention is not limited to the specific embodiments thereof except as defined in the appended claims.

We claim:

1. Process of polymerizing a liquid composition comprising a monomeric polymerizable organic compound, in elongated shapes, which comprises introducing into a substantially vertically positioned elongated mold closed at the lower end, a substantial quantity of said liquid composition and applying heat from an external source to the bottom of the mold only until said liquid composition is polymerized to a solid body, and simultaneously subjecting said liquid composition to a pressure of at least 50 pounds per square inch, the initial viscosity of said liquid composition being sufficient to prevent development of convection currents therein during said polymerization.

2. Process of polymerizing a liquid composition comprising a monomeric polymerizable organic compound, in elongated shapes, which comprises introducing into a substantially vertically positioned elongated mold closed at the lower end, a substantial quantity of said liquid composition and applying heat from an external source to the bottom of the mold only until said liquid composition is polymerized to a solid body, and simultaneously subjecting said liquid composition to a pressure of 50–200 pounds per square inch, the initial viscosity of said liquid composition being sufficient to prevent development of convection currents therein during said polymerization.

3. Process of polymerizing a liquid composition comprising monomeric methyl methacrylate, in elongated shapes, which comprises introducing into a substantially vertically positioned elongated mold closed at the lower end, a substantial quantity of said elongated composition and applying heat from an external source to the bottom of the mold only until said liquid composition is polymerized to a solid body, and simultaneously subjecting said liquid composition to a pressure of at least 50 pounds per square inch, the initial viscosity of said liquid composition being sufficient to prevent development of convection currents therein during said polymerization.

4. Process of polymerizing a liquid composition comprising monomeric methyl methacrylate, in elongated shapes, which comprises introducing into a substantially vertically positioned elongated mold closed at the lower end, a substantial quantity of said liquid composition and applying heat from an external source to the bottom of the mold only until said liquid composition is polymerized to a solid body, and simultaneously subjecting said liquid composition to a pressure of 50–200 pounds per square inch, the initial viscosity of said liquid composition being sufficient to prevent development of convection currents therein during said polymerization.

5. Process of polymerizing a liquid composition comprising monomeric methyl methacrylate containing at least 5% thereof of polymerized methyl methacrylate, in elongated shapes, which comprises introducing into a substantially vertically positioned elongated mold closed at the lower end, a substantial quantity of said liquid composition and applying heat from an external source to the bottom of the mold only until said liquid composition is polymerized to a solid body, and simultaneously subjecting said liquid composition to a pressure of 100–200 pounds per square inch.

CHARLES M. FIELDS.
REUBEN T. FIELDS.